United States Patent Office 3,506,570
Patented Apr. 14, 1970

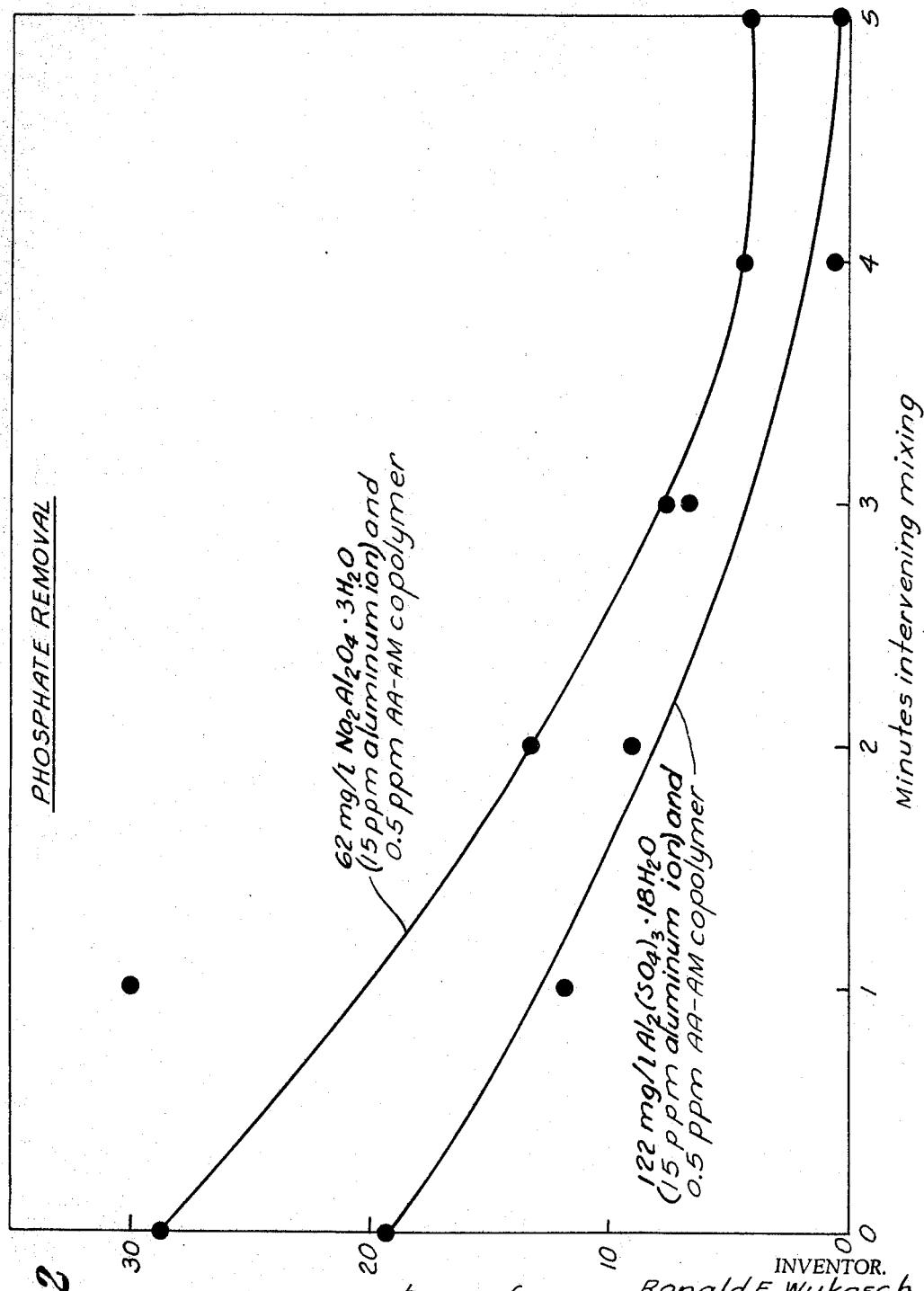

3,506,570
CLARIFICATION OF AND PHOSPHATE REMOVAL FROM SEWAGE
Ronald F. Wukasch, Midland, Mich., assignor to The Dow Chemical Company, Midland, Mich., a corporation of Delaware
Filed May 8, 1968, Ser. No. 727,462
Int. Cl. B01d 21/01
U.S. Cl. 210—49                                5 Claims

ABSTRACT OF THE DISCLOSURE

The total phosphate content of municipal or industrial waste streams is efficiently reduced by incorporating from about 10 to 30 parts per million by weight of trivalent aluminum ion into the waste followed by the application of a particular acrylamide-acrylic copolymer under flocculating conditions with intervening mixing for at least about 3 minutes. The preferred copolymer is a compound of from about 80 to 50 weight percent acrylamide or methacrylamide interpolymerized with from about 20 to 50 percent acrylic or methacrylic acid or the alkali and ammonium salts thereof and is further characterized by a molecular weight of at least about 2 million.

---

Figure 1:
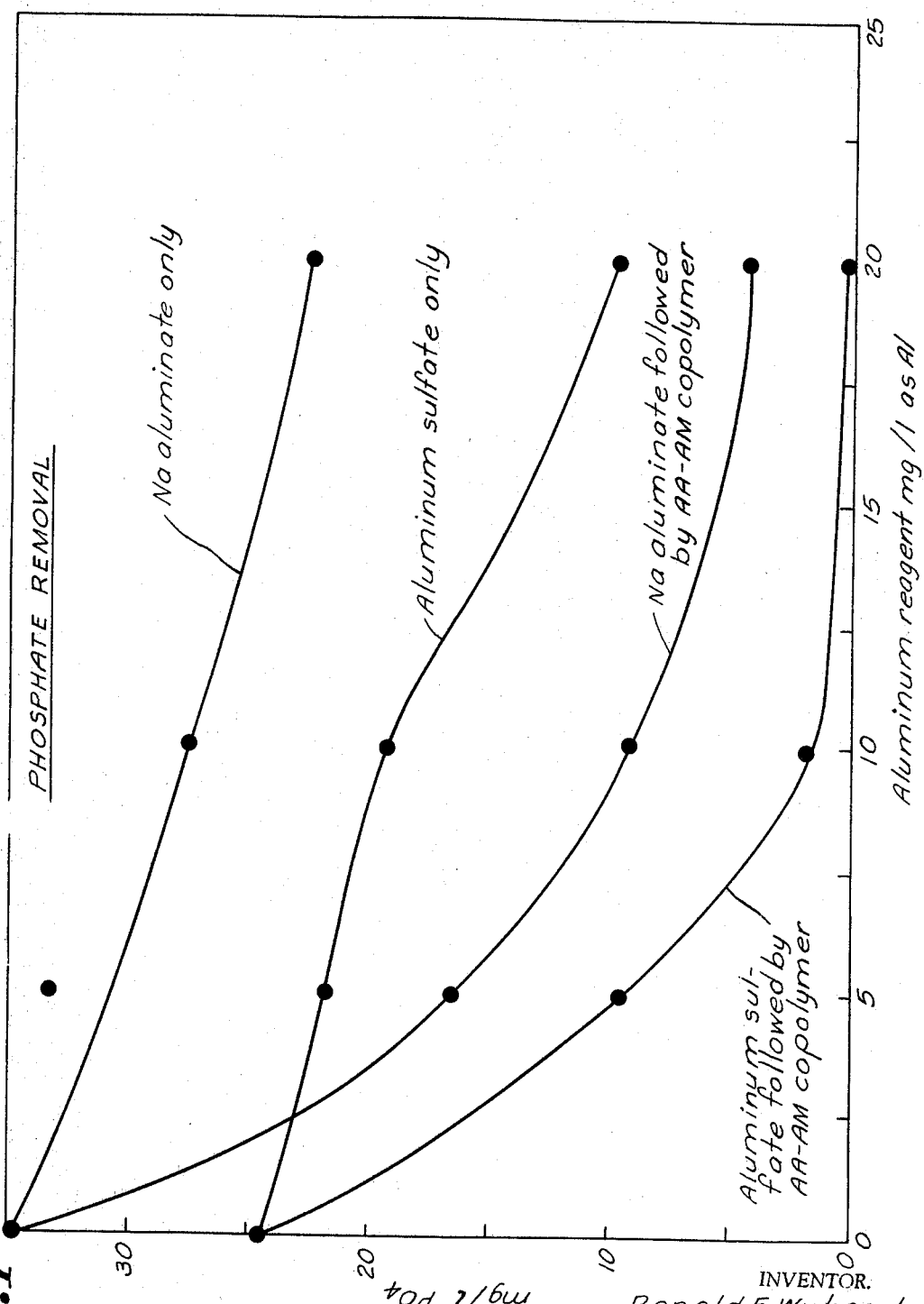

In recent years, the removal of phosphates from aqueous wastes such as municipal and industrial sewages has become a principal objective in waste treatment processes. The phosphates are undesirable because of their nutritive value to aquatic plants which can clog water courses and sometimes render water bodies unusable.

Chemical analyses of aqueous wastes have shown the total phosphates to comprise a soluble and an insoluble portion. The soluble portion is further classified as consisting essentially of ortho phosphates and polyphosphates. The solid phosphates are generally believed to be present in the waste as the anion of precipitated metal salts and as a constituent ingredient of various organic solids. It is known that the soluble phosphates are precipitated by the addition of various metal ions. Among the metal ions known to have this capability is trivalent aluminum which may be supplied for example as aluminum sulfate or sodium aluminate. Also taught is the practice of employing conjunctively with aluminum ions various polyelectrolytes known to produce flocculation in solids suspensions. For examples of such technology see Canadian Patents 662,534 and 607,440.

In light of what has been discovered in connection with the development of the instant invention, it is possible to surmise that some phosphates must have been removed in the waste treatment processes described in the above patents, but such results would not have been efficiently achieved except on an inadvertent basis. Moreover, the previous art in this field has generally taught the use of relatively large amounts of reagents in the treatment of waste streams.

It is therefore an object and benefit of the instant invention to provide a novel process for reducing the total phosphate content of aqueous wastes on an efficient basis. More particularly, it is a benefit sought herein to substantially separate all forms of phosphates, i.e. soluble and insoluble, from aqueous waste streams. Most especially, it is an object to achieve efficient phosphate removal with the use of small amounts of reagents. The above objects and other benefits, such as the simultaneous improved clarification of aqueous wastes, are achieved in accordance with the invention hereinafter described.

The instant invention is a waste treatment process directed to reducing the total phosphate content of municipal and industrial waste streams. In a particular waste treatment plant, in which a waste stream passes through a flocculation zone and then a settling zone, a point is selected in the waste stream at least about 2 minutes, preferably at least 5 minutes, flow time removed from the flocculation zone for the introduction of aluminum ion. This may be provided in the form of aluminum sulfate or sodium aluminate. A sufficient amount of the metal compound is used to provide from about 5 to about 30 parts per million by weight of the aluminum ions. For the aluminate, this dose range would correspond to about 20 to 120 parts per million by weight of sodium aluminate. Assuming any alum employed would have the formula $$Al_2(SO_4)_3 \cdot 18H_2O$$

from about 60 to 360 parts per million of this material would be used. The aluminum ions are preferably incorporated as an aqueous solution. Application solutions will usually contain from about 1 to about 15 percent by weight of the metal ion.

After allowing the aluminum ion to disperse and interact throughout the aqueous waste stream for a period of at least about 2 minutes, preferably with agitation supplementary to that as may occur due to the stream flowing through conduits, a small amount, e.g. from about 0.1 to about 1 part per million, of an acrylamideacrylic acid type copolymer as hereinafter characterized is introduced into the stream under conditions characterized as flash mixing. Following this mixing step, the treated suspension is subjected to flocculating agitation to produce settable flocs. The suspension is then maintained under relatively quiescent conditions to allow settling and thus solids separation.

The polymer of optimal properties for this purpose is a copolymer of from about 80 to 50 weight percent acrylamide or methacrylamide and correspondingly from about 20 to 50 percent acrylic acid or methacrylic acid or an alkali metal or ammonium salt thereof. It is characterized by a weight average molecular weight of at least about 2 million, as measured by the light scattering technique. Such polymers are known to the art and are available from several commercial sources.

It does not appear to make a substantial difference as to how the copolymers are prepared. That is to say, a suitable copolymer may be obtained by the partial hydrolysis of a homopolymer of acrylamide or methacrylamide to introduce the necessary proportion of carboxylic moieties. Alternatively, the polymer may be obtained as by copolymerizing acrylamide and acrylic acid or its salts in solution. By solution polymerization is meant polymerization in simple solution, as well as emulsion and bead polymerization processes in which the aqueous monomer solution becomes a discontinuous phase in a distinct polymerization medium. It is to be understood, however, that the method of preparation is not a limiting parameter so long as the polymer meets the specified physical properties. For the purposes hereof, the polymers are useful if they are characterized by a viscosity of at least about 10 centipoises for a 0.5 weight percent solution thereof in 4 percent sodium chloride at pH 7 and 25° C., as measured with an Ostwald viscometer.

Flash mixing is accomplished by dispersing a dilute aqueous solution of the polymer containing from about 0.1 to about 1.0, preferably from about 0.25 to about 0.5 percent by weight dissolved polymer into the aluminum-containing aqueous stream. Such mixing is facilitated by inducing turbulence in the stream as by rapid mechanical agitation or hydrodynamic turbulence in the stream at high flow rates. This is a critical aspect of the process. If the mixing is too slow, large flocs are formed which are difficult to settle. Also the capture of precipitated phosphate compounds is relatively inefficient. On the other hand, when the rate of mixing is too high incipient flocs and polymer are prematurely sheared with the production of small and again poorly settling flocs. Satisfactory flash mixing can be achieved with paddle agitators operating in the range from about 20 to about 150 r.p.m. or hydrodynamic turbulence characterized by Reynolds numbers from about 2,000 to about 20,000, for a short period of 5 to 90 seconds or so.

The data in respect of the following specific embodiments is graphically demonstrated in the accompanying drawings. Comparatively, the importance of utilizing the specified polymers with the aluminum ions and the criticality of a minimum period of intervening mixing between introduction of the aluminum ion and polymer are shown.

EXAMPLE SERIES 1

The data of the following operations are shown in FIGURE 1 of the accompanying drawings.

Aliquots of a municipal sewage of a midwestern city were subjected to flocculation treatments. One treatment involved the addition of aluminum sulfate only and a second involved the addition of aluminum sulfate followed, after intervening mixing of 5 minutes, with a high molecular weight acrylamide-acrylic acid copolymer sodium salt (AA-AM copolymer).

In more detail, the procedure involved introducing into the aliquot of waste a specified amount of aluminum ions in the form of aluminum sulfate (chemical formula $Al_2(SO_4)_3 \cdot 18H_2O$) was a dilute 1.0 percent by weight of aluminum solution in water. The copolymer contained 70% acrylamide and 30% sodium acrylate and had a viscosity, as hereinbefore defined, of about 15 centipoises. It was believed to have a molecular weight of about 5 million.

The mixture with aluminum ion was turbulently agitated for about 5 minutes by means of a Phips-Bird agitator operated at 80 r.p.m. in a one liter jar. In those runs in which the polymer was subsequently added, a sufficient amount was used to introduce approximately 0.5 part per mililon by weight of active polymer.

The polymer was introduced under conditions characterized as flash mixing. That is, the agitator was operated at 100 r.p.m. for approximately 1.0 minute. Thereafter, the agitator was operated at 40 r.p.m. for 3 minutes under flocculating conditions, i.e., agitation sufficient to promote solids agglomeration without simultaneous shearing of flocs. The treated sewage was then allowed to settle for 5 minutes with the agitator operating at 5 r.p.m. to simulate the relatively quiescent conditons normally encountered in sedimentation tanks. At this point, a sample of overhead was removed from approximately 1.5 inches below the surface of liquid and analyzed for its total phosphate content. This includes the total of soluble (ortho and polyphosphates) and insoluble phosphates. The latter analysis was accomplished according to standard analytical procedures.

FIGURE 1 of the accompanying drawings illustrates substantially improved removals of phosphates, as represented by the total phosphate analysis, achieved with the conjunctive employment of polymer with either aluminum sulfate or sodium aluminate administered in small quantities as described above. It will be observed that a small amount of polymer substantially enhanced the capture of phosphates and that a small amount of metal ion efficiently converts the available phosphates to an insoluble form, which can be separated by solids-liquid separatory techniques, thus permitting phosphate removal in primary clarifiers.

It is of interest that other types of polymers such as high molecular weight cationic polymers are relatively inefficient as flocculation reagents for the capture of precipitated phosphates.

EXAMPLE SERIES 2

The data of the following operations are shown in FIGURE 2 of the accompanying drawings.

Utilizing a fluocculation procedure similar to that described above, two additional series of flocculation operations were conducted utilizing sodium aluminate and aluminum sulfate respectively in conjunction with the acrylamide-acrylic acid copolymer sodium salt. The variable explored was the requirement of intervening mixing between the introduction of a metal ion and the polymer. The data which shows the total phosphate content of the supernatant layer of a treated and settled aliquot, as a function of intervening mixing time, is shown in FIGURE 2 of the accompanying drawings. From such data it is evident that approximately 2 to 3 minutes minimum intervening mixing time is desirable to achieve the benefits of the instant invention.

What is claimed is:

1. In a process for clarifying and removing phosphates from an aqueous waste which comprises subjecting the waste to flocculating conditions and separating suspended solids from the aqueous phase, the improvement which comprises incorporating into the aqueous waste stream, from about 5 to about 30 parts by weight of aluminum ions per million parts by weight of aqueous waste, said amount of aluminum ions being effective to convert the available phosphates to an insoluble form, and thereafter, following intervening mixing for a duration of at least about 2 minutes, incorporating a small amount of a high molecular weight copolymer of from 80 to 50 weight percent acrylamide or methacrylamide and from 20 to 50 weight percent acrylic or methacrylic acid, or water-soluble salt thereof, said amount of copolymer being effective to enhence the capture of phosphates, prior to subjecting the waste to flocculating conditions.

2. A method as in claim 1 wherein the intervening mixing is at least 5 minutes.

3. A method as in claim 1 wherein the polymer is mixed with the aluminum containing waste under turbulent agitation to produce flash mixing of the polymer.

4. A method as in claim 3 wherein the turbulent agitation is induced by a rotating agitator operated at 20 to 150 r.p.m. for a period of 5 to 90 seconds.

5. A method as in claim 1 wherein the amount of polymer incorporated into the aluminum containing waste is from about 0.1 to about 1.0 part per million by weight based on the weight of the system treated.

References Cited

UNITED STATES PATENTS

| 3,171,802 | 3/1965 | Rice et al. | 210—53 X |
| 3,377,274 | 4/1968 | Burke et al. | 210—53 |
| 3,386,911 | 6/1968 | Albertson | 210—18 |
| 3,423,309 | 1/1969 | Albertson | 210—53 X |

FOREIGN PATENTS

| 607,440 | 10/1960 | Canada. |
| 816,399 | 7/1959 | Great Britain. |

OTHER REFERENCES

Symons, G. E., Coagulation, Water & Sewage Works, November 1955, vol. 102, pp. 470–475.

MICHAEL E. ROGERS, Primary Examiner

U.S. Cl. X.R.

210—53